Aug. 18, 1964  F. H. G. R. HERZ  3,145,381
DISTANCE MEASURING SYSTEM
Filed July 24, 1958  3 Sheets-Sheet 1
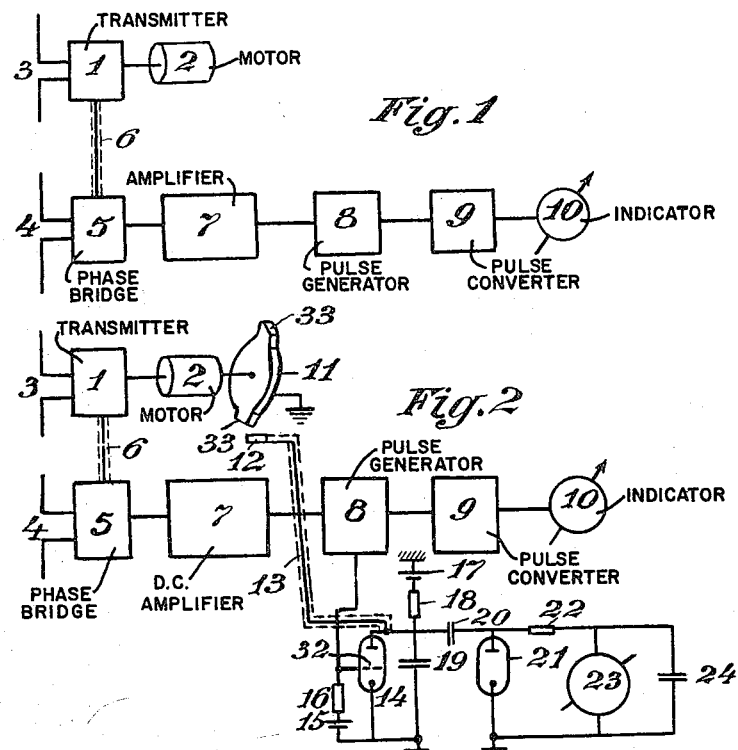
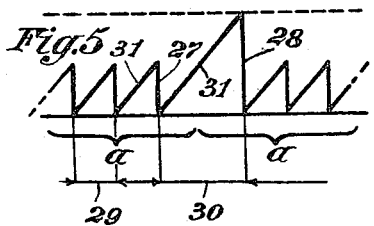
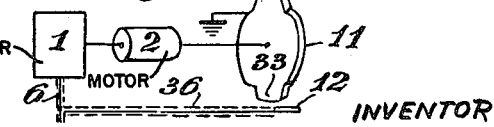
INVENTOR
FRIEDRICH HANS GUSTAV ROBERT HERZ
ATTYS.

Aug. 18, 1964  F. H. G. R. HERZ  3,145,381
DISTANCE MEASURING SYSTEM
Filed July 24, 1958  3 Sheets-Sheet 2
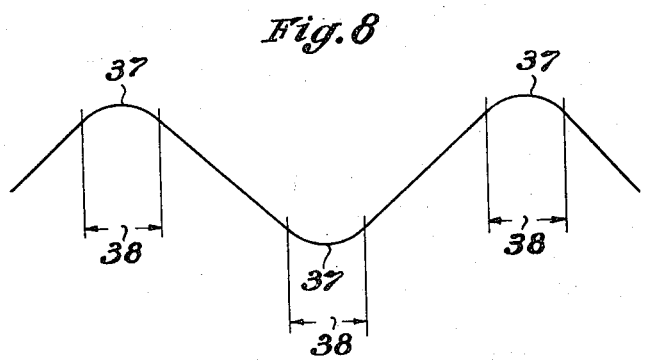
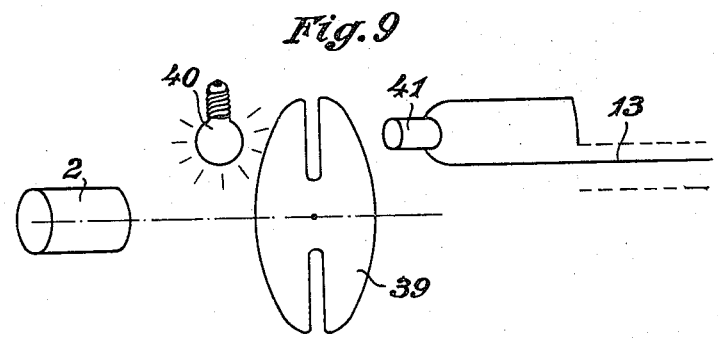
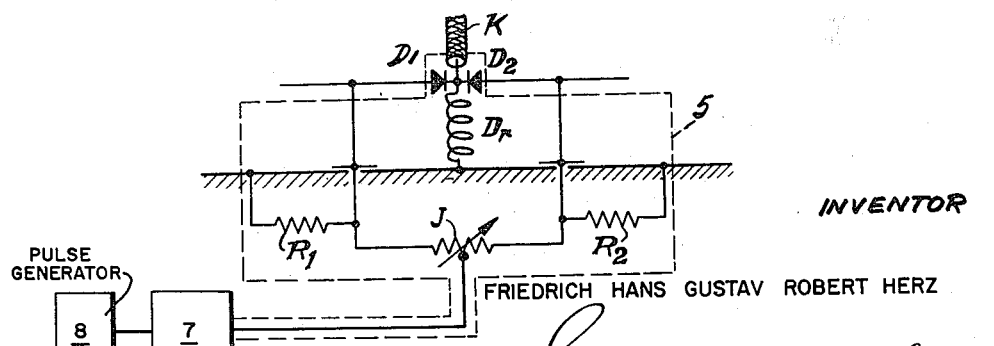
INVENTOR
FRIEDRICH HANS GUSTAV ROBERT HERZ
ATTYS.

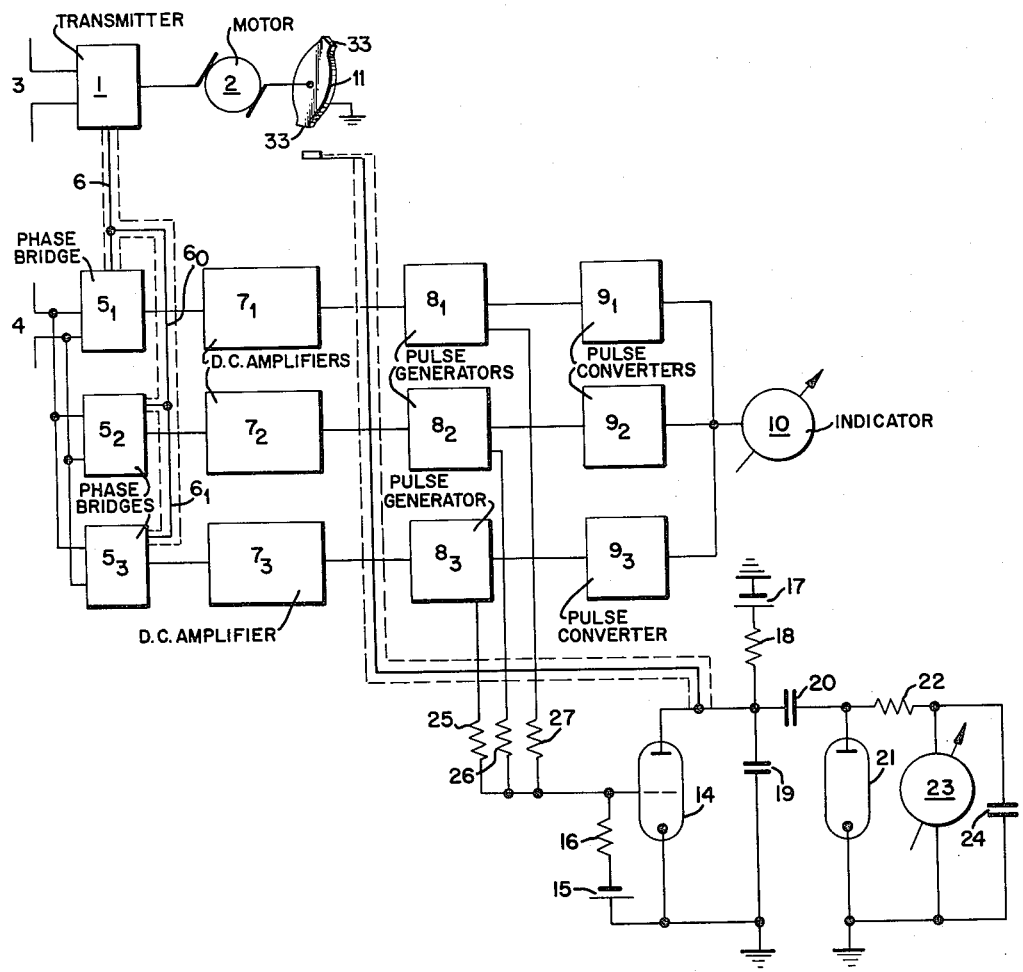
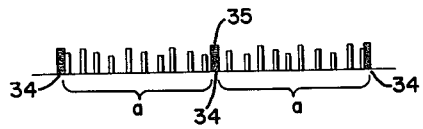

United States Patent Office 3,145,381
Patented Aug. 18, 1964

3,145,381
DISTANCE MEASURING SYSTEM
Friedrich Hans Gustav Robert Herz, 42 Machnower
Strasse, Berlin-Zehlendorf, Germany
Filed July 24, 1958, Ser. No. 750,682
Claims priority, application, France, Dec. 31, 1957,
755,024, Patent 1,349,853
3 Claims. (Cl. 343—14)

Methods of electrically measuring the height at which an object is flying above the ground by means of a high-frequency appliance are known, which are particularly suitable even for the small altitudes of an aircraft while landing. Such appliances contain a transmitter which automatically changes its frequency and a receiver which compares the energy radiated by the transmitter with the energy reflected by the ground. These appliances often form a single unit. The phase relationships between the incoming energy and the radiated energy which thus arise produce maxima and minima and may produce zero points, and the frequency of repetition of these processes during a periodical frequency change provides a measure for the height of the aircraft above the ground.

This known measuring apparatus however has the disadvantage that intermediate values cannot be obtained. A further disadvantage is that in the indication the next higher number appears, with repeated lead, before the actual height is reached.

It has also been proposed to use the interval between two frequencies, for which the phase relationships in the aircraft are the same as a measure for the height. No practical use has yet been made of this idea for automatic measurement.

The present invention is based on the measurement of the frequency interval, but converts this measurement into an automatic one, steps being taken to ensure that the frequency change is a linear function of time. In order to achieve this, it is only necessary to connect an additional device to the previously known appliance, and to ensure that the frequency change of the transmitter is a linear function of time. This additional appliance measures the time interval between repetitions of identical phase relationships between the radiated energy and the returning energy.

Methods of measuring distance by means of variable waves, preferably electromagnetic waves, in which the phase relationship between the transmitted energy and the energy reflected back by the object is used for measurement are known. In order to enable the inventive step to be better understood, I shall first describe what is already known.

A transmitter in one wing of an aircraft transmits electromagnetic oscillations of which the wavelength changes periodically. The change in frequency is as uniform as possible during the measurement period. It takes place between two predetermined set frequencies. In the other wing of the aircraft there is a receiver which receives directly from the transmitter, and also receives the energy reflected from the ground. The receiver has no special means of distinguishing between the origins of the energies. The resulting antenna voltage is dependent inter alia on the phase position of the direct wave relatively to the reflected wave. The change in the wave length causes the phase relationships to change relatively to one another, and maxima and minima of the antenna voltage are produced. The number of the maxima and minima in each measurement period is the measure for the height of the aircraft.

The method has three disadvantages:

The interference modulation of that part of the energy which passes directly from the transmitter to the receiver must be small, in the measurement result, as compared with the resulting maxima and minima, or must be very different at low frequency. This requirement is rather hard to comply with, since in the aircraft the transmitter, the antenna and many metal parts (in the radiation field) oscillate mechanically.

Measurement is possible only if minima and maxima in the received direct current are clearly defined. Therefore, a large frequency variation is needed for small heights, or else small heights cannot be measured at all.

Measurement at small heights is very inaccurate, although this is just where accuracy (for instance on landing) ought to be greatest. Moreover, the height indicator jumps, without measuring intermediate values.

Because of the fixed limit frequencies for each height range, a large frequency range is taken up unnecessarily at large heights.

In order largely to remove the first three of these disadvantages, it is proposed to cease using the number or frequency of the fluctuations in the antenna voltage as a measure for the height, and instead actually to measure the change in the phase position of the reflected waves relatively to those of the transmitter, by means of a phase bridge.

The accompanying drawings diagrammatically illustrate one of the previously known forms of the apparatus, and also the contribution made by the present invention. In these drawings, FIGURE 1 is a circuit diagram of the known height-measuring apparatus for aircraft.

FIGURE 2 is a circuit diagram for height-measuring means on aircraft, with additions made in accordance with the present invention, in which a cam stud 12 is connected to the circuit by means of a cable 13, FIGURE 3 illustrates the pulses of the known installation shown in FIGURE 1, FIGURE 4 shows the pulse arrangement in accordance with the invention, FIGURE 5 graphically illustrates the conversion of the pulses of FIGURE 3 into saw-tooth voltages, FIGURE 6 shows the same conversion, for the pulses of FIGURE 4, FIGURE 7 shows a part of the circuit diagram of FIGURE 2, in modified form, in which the cable 13 is omitted and instead a cable 36 is interposed between the connecting cable 6 and the stud 12, FIGURE 8 shows a frequency change curve, with rounded parts, FIGURE 9 diagrammatically illustrates a light-operated switch employing a photo cell, FIGURE 10 diagrammatically illustrates a phase bridge, FIGURE 11 is a circuit diagram similar to that of FIGURE 2 with the receiving antenna and transmitter coupled in parallel to three similar phase measuring bridge having individual outputs, and FIGURE 12 graphically illustrates the increased number of pulses in a measuring period provided by the circuit of FIGURE 11 as compared to that provided by the circuit of FIGURE 2 as shown in FIGURE 4.

In the previously known height-measuring devices for ascertaining the altitude of an aircraft, as shown in FIGURES 1 and 3, the frequency of the waves emitted by a transmitter 1 is periodically changed by a motor 2. This change has fixed limits and is preferably a linear function of time. The transmitter 1 radiates its energy towards the ground through the antenna 3. The second antenna 4 receives the reflected radiation energy and compares it, in a phase bridge 5, with the radiated transmission energy which is supplied to the phase bridge 5 through the cable 6. The result of the comparison in the phase bridge is a low-frequency alternating current supplied to the amplifier 7 which regulates itself to the same output voltage. In the succeeding pulse generator 8, pulses are formed from the voltage amplitudes of this alternating current. The pulses 25 as graphically illustrated in FIGURE 3 are converted into the indicator current in the pulse converter 9, and into pointer deflections in a moving-coil instrument 10. The pointer travels over an altitude scale, and shows the height of the aircraft above the ground. This known measuring apparatus only permits measurement of the altitude in steps, corresponding to the number of pulses 25, as shown in FIGURE 3.

The number of pulses 25 does not increase immediately as the height increases. As the height becomes greater, a pulse is added transiently about five times before it finally remains in the series of pulses. Correspondingly, the indiction also alternates five times between one height step and another, so that the device shows a continuously fluctuating height value.

In accordance with the invention these disadvantages are avoided by the fact that the interval 26 between each two pulses 25 is used as a measure for the height, whereas previously, in accordance with the known method last described, the number of pulses during a measurement period was used for determining the height. This different method of measurement has the advantage that the measurement of height can be effected continuously and not in steps as before, and that the abovementioned fluctuation between indicated values is avoided.

This novel method is carried into effect by making the pulse series into a series of saw-teeth, as shown in FIG. 5, of which the rising flanks run parallel to one another, so that the peak height 27, 28 of each saw-tooth is determined by the interval 29 or 30 between the individual pulses.

The saw-toothed voltage curve shown in FIG. 5 is produced by the fact that a condenser 19 is connected to a battery 17 through a resistance 18 as shown in the circuit diagram of FIG. 2. This produces the voltage rise 31 as shown in FIG. 5.

During the voltage rise 31 the triode 14 is blocked by the bias voltage applied to the grid 32 through the resistance 16 by the battery 15.

When a pulse comes from the pulse device 8, its voltage overcomes the bias voltage, so that a current flows in the anode circuit of the triode 14. This current discharges the condenser 19. This discharge phase corresponds to the vertical descending flanks 27, 28 of the saw-tooth curve.

As shown in FIG. 3, it may easily happen that in successive measurement periods $a$ the interval 37' between the last pulse of one period and the first pulse of the following period is at the time larger than the interval 26 between two pulses within one and the same period; thus, parts of the saw-toothed curve are produced in which the height 28 is substantially greater than the height 27 within the measurement periods. This is disadvantageous for measurement purposes, since this too causes stepwise measurement processes to occur.

In order to remove these disadvantages, the condenser 19 is discharged between the measurement periods $a$. As shown in the circuit diagram of FIG. 2, this is effected by connecting a cable 13 to a stud 12 arranged in front of a cam disc 11. This cam disc 11 has switch studs 33 arranged diametrically opposite one another, which pass in front of and make contact with the stud 12 at a frequency depending on the speed of rotation of the motor 2. The contact closure between the switch studs 33 and the stud 12 takes place at the transition points 34 between each two successive periods $a$. Since the disc studs 33 are earthed, at the moment of contact closure the condenser 19 is earthed through the conductor 13 and thereby discharged. This construction however has the disadvantage that a conductor between the transmitter and the receiver is needed for earthing purposes.

Instead of the cam disc 11 it is also possible to use a light-operated switch as shown in FIGURE 9. This comprises a slotted disc 39 driven by the motor 2. On one side of the disc, above its axis, there is an electric light bulb 40 receiving current from a direct current source not shown in the drawing. On the opposite side of the disc is a photo-cell 41 which supplies its current pulses to the conductor 13 shown in the circuit diagram of FIGURE 2. As the disc 39 rotates, light periodically falls on the cell 41, so that an effect is produced which is similar to that produced by the studs 33.

In order to avoid this disadvantage also, at any suitable point a voltage change is produced which then gives rise to the pulse 35 at the point 34 as shown in FIG. 4. A simple voltage change producing this effect can be brought about by connecting the energy in the cable 6 to the stud 12 by a cable 36, as shown in FIG. 7, so that the energy is short-circuited to earth. In this modification, the cable 13 is not present. If on the other hand the cable 13 is used, the cable 36 must not be provided.

By interposing the pulse 35, a saw-tooth curve is obtained in which, as shown in FIG. 6, the righest peak voltages correspond to the uniform intervals between the individual pulses within the measurement period.

Also, the pulse 35 can be made so wide that the times at which the frequency variation of the transmitter is not linear, can be removed from the measurement process.

FIG. 8 shows that the theoretically saw-toothed frequency change in practice has rounded parts 37 at the peaks, i.e., at the reversal points of the frequency change. Since only the linear parts of the frequency curve are to be used for measurement, as mentioned above, the regions 38 of the curve have to be excluded. This is effected by making the pulse 35 (FIG. 4) correspondingly wide; for this purpose the two studs 33 are made correspondingly wide.

For measuring height, it is now necessary to measure the height 37 of the highest peak voltages, as shown in FIG. 6. This is done with the aid of a diode 21 which is coupled to the condenser 19 through a condenser 20. The direct voltage produced by the diode is supplied through the resistance 22 to a direct current indicating instrument, for instance a moving coil instrument 23 of which the scale is calibrated directly for height. The condenser 24 is used for smoothing the voltages that arise.

As regards mathematical function, the pointer interval readable on the instrument represents the reciprocal value of the height. This reciprocal mathematical relationship achieves the advantage that the theoretical reading accuracy is the same in all regions of the scale, whereas in the known method the accuracy became progressively less in those low numerical regions where it is particularly important.

When an aircraft is nearer the ground, the difference between the transmitted and the reflected frequency will be smaller, fewer pulses will be produced per second, and the current in the reading instrument will be greater, then when the aircraft is further away from the ground; and when the aircraft is closer to the ground a given change in the height of the aircraft will produce a greater proportional change in the number of pulses per second and in the current in the instrument, than when the aircraft is further away from the ground. For instance, if the aircraft is thirty feet above the ground and then descends to fifteen feet, this will halve the frequency difference and number of pulses per second, and double the current; whereas, if the aircraft is flying a thousand feet above the ground and then descends fifteen feet, this change will produce a very much smaller proportional difference in the current in the reading instrument than in the case where the initial height of the aircraft was thirty feet.

The previously known counting method called for a relatively high frequency of the transmitter and large changes in the frequency thereof, which was a disadvantage.

The thought processes that led to the present invention started from the fact that the relative phase position between radiated energy and energy reflected from the ground can be very accurately determined under certain conditons, that is to say if a phase bridge is used which is formed as a phase bridge on the direct current side also. When the phase displacement of the transmitter energy from the received energy is 90°, the phase bridge makes the direct current value zero, independently of the magnitudes of the energies to be compared. For this purpose, as a modification of the circuit shown in FIG. 2 a direct voltage amplifier must be substituted for the ordinary alternating current amplifier 7. This direct voltage amplifier produces the result that not only the voltage change, but also its reference lines is transmitted to the pulse device 8. The use of this direct voltage amplifier has the advantage that accurate measurement is possible even when few pulses are produced.

A further inventive idea is that the frequency change up to the occurrence of the first direct current zero point of this phase bridge is used as a measure for the height of the aircraft.

Lastly, the idea of the invention can also be used for restricting the frequency range used; the frequency variation need only be used between two pulses (zero points of the phase bridge), i.e., the transmitter could be switched off after one of these points has been reached, so that unnecessary use of the frequency band is avoided. From the restriction of the frequency band with increasing height, control stations on the ground or elsewhere could determine the height of the aircraft and thus keep a watch on air traffic.

In accordance with a further modification shown in FIG. 10, it is proposed in accordance with the invention not to use the number or frequency of the resulting fluctuations in the antenna voltage as a measure for the height, as before, but to use the change in the phase position of the reflected waves as compared with those of the transmitter, employing a phase bridge. This consists mainly of a receiving antenna which is so formed as to be insulated from direct current. Instead of the receiver, two diodes $D_1$ and $D_2$ are connected directly to the voltage-carrying points. The free ends of these diodes, which must have the same polarity, are connected to a high-frequency cable through which high-frequency voltage comes from the transmitter. The individual direct currents that arise flow through the resistances $R_1$ and $R_2$ to earth and back to the diodes through the choke $D_r$. The instrument J measures the differential direct voltage hereinafter referred to as the bridge voltage. The bridge voltage is zero when the high-frequency comparison voltage of the transmitter, which voltage is applied to the bridge, is 90° out of phase with the high-frequency receiving voltage. If the receiving antenna gets no direct energy from the transmitter apart from this comparison voltage, then the zero point of the bridge voltage will not be influenced by any disturbance of the amplitude of the transmitter. The phase component of the transmitter disturbance would alter a count only if it changed the limit frequencies. The zero points in each measurement period are a measure for the height.

If the receiving antenna is not to be decoupled from the transmitting antenna, or if the transmitting antenna is used at the same time as receiving antenna, then the high-frequency comparison voltage at the diodes of the phase bridge must be 90° out of phase with the direct transmitter energy, so that no bridge current will arise from this insufficiency.

In addition to this freedom from disturbance, the phase bridge produces clear zero values and no minima in a disturbed direct current. With the smallest frequency variation, the zero point is to be observed in the vicinity of the frequency in question. Since the zero points can be accurately determined, for measuring height it is only necessary to observe the frequency interval of two zero points, as soon as two appear within the measurement period. Thus, all intermediate values can be established, whereas the method used heretofore could only supply its first unsteady and inaccurate value.

If the phase shift on reflection over the airfield is assumed to be constant, then the frequency of a single zero point within the measurement period can be used as a measure for the height. In this method also, values varying continuously with height are obtained.

It will now be obvious that observation of the frequency interval at small heights can be combined with use of the counting method at large heights.

With a receiving antenna decoupled from the transmitter, it is possible to form two or more phase measuring bridges producing zero points at different frequencies. For this purpose, the comparison voltages received from the transmitter by the various phase bridges must differ from one another in phase. The zero point series displaced from one another in time can be put together at low frequency, in order to increase the zero points for each height. This is illustrated in FIG. 12 where three times the number of zero points occur by the use of three phase measuring bridges as shown in FIGURE 11.

In the circuit of FIG. 11, the transmitter 1 is coupled to the three phase measuring bridges $5_1$, $5_2$, $5_3$ in parallel by means of transmission lines 6 and $6_0$. The receiving antenna is likewise coupled to all of the bridges in parallel. As understood from the above discussion, the comparison voltages received from the transmitter by the various phase measuring bridges must differ from one another in phase. This can be provided by proper selection of the lengths of the sections of transmission lines 6 and $6_0$. The output from each bridge is applied respectively to the input of one of the direct voltage amplifiers $7_1$, $7_2$, $7_3$. The outputs of the individual pulse generators $8_1$, $8_2$, $8_3$ are applied in parallel to the control grid of tube 14 by resistances 25, 26 and 27 which are used only for decoupling. As indicated by FIG. 11, the combination of the impulses produced by devices $8_1$ to $8_3$, from the delayed zero points in the phase bridges $5_1$ to $5_3$, causes three times the number of pulses to appear at the grid of tube 14. By this means, with the same frequency change, the apparatus can measure as little as one third of the same height before the number of pulses becomes too small for measurement.

In view of the sharp definition of the zero points it is now obvious that the change in wave length can be automatically restricted by the occurrence of two zero points in the bridge voltage, so that the frequency shift takes place only between these two points. The frequency width (wave width) obtained is then a measure for the height. The narrowing of the frequency band would be useful to other radio users. The flying authorities could watch the height of an aircraft by electrical means.

I claim:

1. A system for measuring the distance between a location and a distant object comprising, means for generating oscillations including means for periodically varying the frequency of oscillations substantially linearly with respect to time between a predetermined upper and lower frequency, means for radiating the oscillations, a network responsive to the simultaneous application to its input of reflected signals from the object and the varying frequency oscillations from the generator to produce output signals at each occurrence of a predetermined phase difference between the reflected signals and the varying frequency oscillations, voltage generating means normally operative upon energization thereof for generating a voltage which increases in amplitude with respect to time, means responsive to the output signals from the network for terminating generation of the voltage whereby a sawtooth voltage is produced between two successive signals from the output of the network, and cyclically operating means controlled by the means for repeatedly varying the frequency of oscillations at the respective upper and lower frequency for terminating the generated voltage.

2. A system as defined in claim 1, in which the cyclically operating means deenergizes the voltage generating means as the respective upper and lower frequency of oscillations is reached to cause termination of the generated voltage.

3. A system as defined in claim 1, in which the network generates a minimum output signal at the predetermined phase difference and a minimum output signal in the absence of the varying frequency oscillations from the generator applied to its input, and means controlled by the cyclically operating means as the respective upper and lower frequency of oscillations is reached for interrupting the application of the varying frequency oscillations from the generator to the input of the network to cause termination of the generated voltage, and means for measuring the peak value of the saw-tooth voltage as a measurement of distance.

References Cited in the file of this patent
UNITED STATES PATENTS

| | | |
|---|---|---|
| 2,045,072 | Espenschied | June 23, 1936 |
| 2,426,910 | Wilson | Sept. 2, 1947 |
| 2,436,627 | Blitz | Feb. 24, 1948 |
| 2,802,206 | Blitz et al. | Aug. 6, 1957 |
| 2,878,448 | Maxey | Mar. 17, 1959 |
| 2,933,682 | Moulton et al. | Apr. 19, 1960 |